United States Patent Office 3,440,143
Patented Apr. 22, 1969

3,440,143
METHOD OF PREPARING ENZYMES FROM PLANT TISSUES CONTAINING PHENOLS
Jeremy Brown Roberts, Northborough, Mass., Dallas E. Jones, Guatemala City, Guatemala, and Adnan M. Badran, Amman, Jordan, assignors to United Fruit Company, Boston, Mass., a corporation of New Jersey
No Drawing. Filed May 5, 1966, Ser. No. 547,783
Int. Cl. C12d 13/00
U.S. Cl. 195—66          18 Claims

ABSTRACT OF THE DISCLOSURE

An enzyme concentrate is extracted from naturally occurring plant sources by using as the extractant at $-10°$ to $+5°$ C. a 0.5–5% aqueous solution of a polyalkylene glycol having an average of at least about 25 alkylene oxide units per molecule and having 2–3 carbon atoms in each alkylene group.

---

This invention relates to the recovery and concentration of enzymes from plant tissue and pertains more specifically to a method for preparing enzyme concentrate of improved activity and color, and to an extractant for use in such preparation.

Although a variety of enzymes are now available commercially in concentrated form, the concentrates generally available tend to be dark in color and to have an undesirably low activity despite such precautions as the use of low temperatures for the extraction procedure. It has been found that the low activity is caused by the presence of phenols which are universally present in plant or vegetable tissue, and which precipitate the enzyme during extraction; in addition, the phenols may be oxidized in the presence of the enzyme, and oxidation products may themselves inactivate some of the enzyme in addiiton to causing discoloration.

One object of the present invention is to provide an extractant and a method for extracting enzymes from plant tissue to produce a concentrate of improved color and activity.

A second object is to provide an improved extractant and method which inactivates or precipitates, to a large extent, the phenols which are naturally present in plant tissue, thus minimizing precipitation and inactivation of the enzyme during the process of extraction and concentration.

Other and further objects will be apparent from the description which follows.

The enzymes to which the inveniton particularly applies include the hydrolases, such as phosphatases, proteases, amylases, glycosidases, saccharases, and the oxidases, such as the phenol oxidases, including both tyrosinase and polyphenol oxidase.

These are naturally occurring enzymes, which have been isolated from a number of different sources, among the best and most convenient of which are plant tissues such as yams, apples, bananas, pineapples, Idaho potatoes, tobacco leaf and mushrooms (*Psalliota campestris*). The conventional procedure for obtaining an enzyme concentrate from these sources is to extract or leach it from the source material, which is preferably in finely divided from, by means of a buffered aqueous extractant.

Although it is believed that many plant tissues contain a relatively high proportion of such enzymes, the separation and concentration of the enzymes by extraction procedures has been plagued by the difficulty that the phenols and enzymes coprecipitate and/or that the solution containing the enzyme rapidly becomes discolored in the presence of air, indicating that some oxidation products are being formed and consequently that some of the enzyme is being inactivated. These difficulties have to some extent been reduced by carrying out the extraction at low temperatures of the order of $-10°$ to $+5°$ C., and by completing the extraction as rapidly as possible. It has also been proposed to employ a small amount of an inert protein, e.g. gelatin, or of polyvinyl pyrrolidone in the aqueous extractant solution to decrease the loss of activity during the extraction procedure.

It has now been discovered that by employing as the extractant an aqueous solution containing dissolved therein a polyalkylene glycol having an average of at least 25 alkylene oxide units per molecule, and in which the alkylene unit contains from 2 to 3 carbon atoms, it is possible to obtain phenol oxidase concentrates of high activity and of very low color. The use of polyalkylene glycols offers the advantage, as compared to gelatin or polyvinyl pyrrolidone, that they are free from nitrogen and thus do not interfere with the determination of activity of the concentrate by measurement of the protein nitrogen content. The polyalkylene glycols also are desirable for this purpose because they are soluble in acetone and thus can readily be separated from acetone insoluble enzymes.

Polyethylene glycol and polypropylene glycol may be used in the present invention, the effectiveness increasing as the degree of polymerization or molecular weight of the glycol increases. Polyethylene glycol having an average molecular weight of about 20,000 (about 500 alkylene oxide units per molecule) has been found to be highly effective, indeed more effective than polyethylene glycols of lower molecular weight.

The amount of polyalkylene glycol present in the aqueous solution should be from 0.5% to 5% by weight for best results. Very much larger quantities, of the order of twenty percent tend to cause precipitation of the enzyme. Since there is no appreciable increases in effectiveness when the amount exceeds about 1–2% by weight, there is no advantage in using higher concentrations.

It has also been found that the effectiveness of the polyalkylene glycol may be enhanced by employing in addition a very small quantity of a surface active agent dissolved in the extractant, the amount of surface active agent ranging from about 0.005% to about 0.05% by weight of the solution. Any surface active agent, whether it be anionic, cationic, or nonionic, appears to be useful. Among the surface active agents which may be used are sodium oleate, sodium stearate, sodium lauryl sulfate, sodium alkylbenzene sulfonates, n-alkyl trimethyl ammonium chlorides, alkyl dimethyl amine oxides, stearyl dimethyl benzyl ammonium chloride, polyoxyethylene sorbitan monolaurate, monopalmitate or monostearate, polyoxyethylene sorbitan trioleate, sorbitan tristearate, sorbitan monooleate, monolaurate or monostearate, polyoxyethylene stearate, glycerol monolaurate, and the like. However, the nonionic surface active agents are preferred, particularly those which are free from nitrogen and thus do not interfere with the use of a protein nitrogen assay for measuring activity of the concentrate. Among the nonionic surface active agents which have been found particularly useful are the sorbitan derivatives mentioned above.

In carrying out the present invention the extractant in the form of an aqueous solution containing the polyalkylene glycol and, if desired, a small amount of surface active agent, is used to extract the source material while maintaining the temperature close to 0° C. (from minus 5° C. to plus 5° C.). The pH of the extractant is preferably maintained from about 5.0 to 7.5; if desired a buffer such as sodium acetate or a conventional phosphate buffer may be employed to maintain the pH in the desired range. The plant tissue used as source material is preferably sliced, crushed, or chopped into small pieces before extraction. In many cases it is desirable to subject the mixture of source material with extractant to maceration or attrition, as for example by passing it through a homogenizer. The relative proportion of extractant and source material may vary over a wide range depending upon the identity of the source material. The greater the ratio of extractant to source material, the more thorough is the extraction, but the greater the amount of liquid which must be removed to obtain the final dry concentrate.

The aqueous solution containing the enzyme may be separated from the source material by any conventional means as for example filtration or centrifugation, and if desired the source material may be subjected to repeated extraction with fresh extractant. The enzyme may then be separated from phenolic substrates, sugar, salts and other low molecular weight materials by conventional procedures, such as by precipitation with acetone or by bringing the solution into contact with a solid absorbent such as a cross-linked dextran polysaccharide (Sephadex G-25), then eluting the enzyme with water. When the acetone precipitation procedure is employed, the best results are obtained by using an amount of acetone which is approximately twice the volume of the aqueous solution, either being introduced drop-wise into the other at a temperature of about −10 to 0° C. The resultant precipitate containing the enzyme may then be separated by filtration or centrifugation, redissolved in water which may contain a buffer if desired, and centrifuged or filtered to separate the solution containing the active material from the inactive undissolved residue. This solution or the solution obtained by eluting the solid absorbent material may then be subjected to further purification either by the foregoing procedures or by other conventional procedures, and finally concentrated by a conventional lyophilization step to yield a dry, soluble product which is white or nearly white in color.

The activity of products prepared in accordance with the present invention is generally more than twice as great as the activities of products prepared by the same procedure without the use of polyalkylene glycol in the extractant. In some cases, particularly when a high molecular weight polyethylene glycol is employed in combination with a surface active agent the activity of the product of the present invention may be as much as eight times or more as high as the activity of a similar product prepared without the use of polyethylene glycol in the extractant. Moreover, high recoveries are obtained. For example, from each gram of fresh banana pulp there may be obtained by the present invention approximately five to ten milligrams of dry concentrate containing 40 to 50 international units of polyphenol oxidase activity (one unit equals amount of polyphenol oxidase which catalyzes conversion of one micromole of dopamine per minute).

In order to illustrate more clearly the nature of the present invention, the following specific examples are described, but it is not intended to limit the invention solely thereto.

Example 1

Approximately 250 grams of sliced ripe banana pulp was vacuum infiltrated with about 700 milliliters of an aqueous solution containing 1% by weight of sodium acetate and 1% by weight of polyethylene glycol having a molecular weight of approximately 3000–3700 (Carbowax 4,000) at a temperature of approximately 0° C. The mixture was tested to make sure that sufficient polyethylene glycol was present by adding tannic acid to a small sample of the mixture; the formation of a visible precipitate showed the presenct of excess polyethylene glycol. The mixture was homogenized for about two minutes in a Waring Blendor, then centrifuged at about 20,000 g. for 10 to 15 minutes, after which the supernatant solution was poured onto a bed of solid absorbent particles (Sephadex G-25) in a column, the apparent volume of the bed of absorbent being approximately three times the volume of the solution. All of the foregoing operations were carried out while maintaining the temperature of the solution at approximately 0° C. After all of the solution had percolated into the column, the column was eluted with water at approximately 0° C. The eluted aqueous solution was then freeze dried to produce a solid, white, readily soluble product, weighing approximately 2.5 grams and containing approximately 10,000 international units of polyphenol oxidase activity.

When there was added to the extractant described above 0.01% by weight of sorbitan monosterate, a nonionic surface active agent, and the same procedure was followed, the final dry concentrate had an activity approximately 25% higher than the product described above.

Examples 2–4

Three polyethylene glycols of differing molecular weights were evaluated in the following procedure. The first polyethylene glycol had a molecular weight of approximately 1,000, the second a molecular weight of approximately 3,000–3,700 and the third a molecular weight of approximately 15,000–20,000.

Approximately 30 grams of fresh banana was cut to thin slices in approximately 100 milliliters of an aqueous solution containing 1% by weight of the polyethylene glycol and a phosphate buffer maintaining the pH at 6.5. This and subsequent steps of the procedure were carried out while maintaining the temperature at approximately 0° C. The mixture of banana slices and aqueous solution was vacuum infiltrated for thirty minutes, homogenized in a Waring Blendor for about four minutes, then introduced drop-wise into approximately twice its volume of cold acetone maintained at −10° C. The mixture was then centrifuged for ten minutes and the precipitate separated by decantation. The precipitate was dissolved in water buffered to pH 6.5 with phosphate; after about three hours the solution was subjected to centrifugation, decanted to separate it from residual solid material, then freeze dried. All of the foregoing operations were carried out at −10° to +5° C.

The resultant solid concentrate was white or nearly white in color in each case and possessed a very high activity. When compared to a product prepared by the same procedure without the use of the polyethylene glycol in the extractant, the concentrate products of the present invention had the following relative activities:

| Molecular weight of polyethylene glycol: | Relative activity |
|---|---|
| 1,000 | 2.4 |
| 4,000 | 5.6 |
| 20,000 | 5.9 |

Similar results are obtained using polypropylene glycol in the extractant; the activities of the concentrate products may be enhanced by dissolving in the extractant, in addition, a small amount of a surface active agent such as sorbitan monostearate.

Example 5

Approximately 100 grams of sliced, ripe banana pulp was homogenized in a Waring Blendor (at 75% of full speed) for one minute in 500 ml. of an aqueous solution containing 1% by weight of sodium acetate and 1% by weight of polyethylene glycol having a molecular weight of approximately 6,000–7,500 (Carbowax 6000) at a temperature of 0–5° C. The mixture was centrifuged at about 20,000 g. for 10 or 15 minutes at 0° C. The recovered supernatant solution (approximately 500 ml.) was clear and faintly brown in color.

This supernatant solution was poured slowly into approximately 1000 ml. of acetone at −5° to 0° C. with stirring. The grey-white precipitate containing the polyphenol oxidase activity adhered to the stirring blade. The precipitate was scraped from the stirring blade into approximately 150 ml. of water containing 0.01 M phosphate buffer, pH 6.8 to 7.0. The mixture was stirred, allowed to stand overnight, restirred and centrifuged at approximately 25,000 g. for 20 minutes. All these operations were carried out at 0 to 5° C. The recovered supernatant liquid was freeze dried to produce a solid, white to off-white product, weighing approximately 1 gram and containing approximately 4000 international units of polyphenol oxidase activity. The freeze-dried material is only slowly soluble in dilute buffer or water and should be stirred with the water or buffer for 15 to 30 minutes before assay or use.

Examples 6–7

100 grams of sliced premature banana pulp was vacuum infiltrated with 1% polyethylene glycol of 20,000 molecular weight at 4° C. for 20 minutes. Slices were blended with 250 ml. of 5 M NaCl solution containing 1% polyethylene glycol in a high speed homogenizer for 2 minutes at 3–4° C. The slurry was adjusted to pH 7.5 by a Beckman pH-meter using a magnetic stirrer for continuous mixing. The volume was made to 500 ml. by the addition of 2.5 M NaCl and the mixture was left in 4° C. for about one hour to extract the enzyme, which is adsorbed on the cell wall material. The macerate was filtered through Whatman #1 filter paper in a Buchner funnel with a slight vacuum. Five ml. banana extract was used to measure the pectinesterase activity. The assay for pectinesterase activity was carried out titrometrically by measuring increased acidity after freeing carboxyl groups in pectin demethylated by alkalization to pH 7.0–7.5. The reaction mixture was maintained in water bath at constant temperature of 30° C. The pH meter with electrode and a magnetic stirrer was used. The extract assay displayed 1.70 —COAH $\mu$ equiv./min./g. tissue.

The same extraction procedure was repeated under the same conditions but without incorporating polyethylene glycol polymers in the extracting media. Pectinesterase activity exhibited 0.22 —COOH $\mu$ equiv./min./g. tissue.

Second extraction procedure was used for pectinesterase where the filtration step indicated in the previous procedure was substituted by centrifugation. The resulted supernatant exhibited similar yield of pectinesterase to that of the filtrate. The total final supernatant was partially purified by dialysis against a continuous phase of water and then concentrated by freeze-drying to yield a gray powder of the enzyme in a concentrated form.

Example 8

100 grams of premature banana pulp was sliced and immersed immediately in 250 cc. buffered polyethylene glycol of 20,000 molecular weight at pH 4.5. Banana slices were vacuum infiltrated with the solution for 12 minutes. The vacuum treatment was interrupted at 3-minute intervals and immersed slices were shaken vigorously to insure the penetration of the media. Slices were macerated in the cold and thoroughly stirred with 8 grams of 10:1 (w./w.) mixture of sodium chloride (NaCl) and disodium salt of ethylene diamine tetracetic acid (EDTA) containing 1% polyethylene glycol of 20,000 molecular weight, and then kept at 3° C. for 1 hour. The mixture was stirred at 10-minute intervals vigorously. The mixture was than centrifuged and supernatant liquid decanted. The precipitate was solubilized with the same extracting media, stirred and homogenized thoroughly with a Teflon pestle. The reaction mixture was centrifuged and supernatant collected. The solubilization and centrifugation steps of precipitating, washing and dissolving were repeated three more times. Total supernatant containing the polygalacturonase (PG), the pectin-glycoside-splitting enzyme, was stored at 2° C. After the proper dilution 5 cc. aliquot represented the polygalacturonase extract from 1 gram fresh banana pulp. The assay for polygalacturonase activity consisted of 5 ml. extract added to 95 mls. of 1% solution of pectic acid at pH 4.5 at 25° C. Sodium carbonate of 1 M, iodine of 0.1 N stirred thoroughly with the extract and acidified by 2 M sulfuric acid, then residual iodine was titrated with 0.05 N sodium thiosulfate. Changes in reducing value were followed which corresponded to aldose liberated. The activity of increased reducing power expressed as gm. glacturonic acid monohydrate per 100 gm. fresh weight of fruit per hour was 2.2. The activity in a similar extract without incorporating polyethylene glycol in the extracting media was 0.0–0.12.

Examples 9–10

200 grams premature banana slices were vacuum infiltrated with 0.1 M phosphate buffer, pH 7.4, containing 1% polyethylene glycol of 20,000 molecular weight at 4° C. Slices were homogenized in 400 ml. of buffered (pH 7.4) 1% polyethylene glycol at 3° C. in a high speed Waring Blendor for 3 minutes. The homogenate was centrifuged in an angle centrifuge at 2000 r.p.m. for 10 minutes in the cold. Supernatant was decanted and precipitate was rehomogenized by a "Teflon" pestle in the same cold (3° C.) phosphate buffer for 2 minutes and centrifuged as before. All supernatant fluids were combined and their pH was reduced to 5.6 by the addition of cold 1 M acetic acid. The mixture was centrifuged at 5000 r.p.m. for 20 minutes at 3° C. Supernatant was discarded while the precipitate was washed with ice water and sedimented by centrifuging for 5 minutes at 2500 r.p.m. The precipitate was suspended in 300 ml. 0.1 M phosphate buffer at pH 7.4. 1.5 ml. of the extract represent an active succinic oxidase system from 1 gram banana tissue. The activity was tested manometrically by measuring the $O_2$ uptake of the reaction mixture of 1.5 cc. buffer extract of succinic oxidase in the presence of succinate substrate at constant volume, pressure and temperature. Activity yield of tissue extract incorporated with polyethylene glycol was 4–6 times higher than buffer extract without using polyethylene glycol.

The same extract was purified further for cytochrome oxidase by refractionation and precipitation with saturated ammonium sulfate. The enzyme was then extracted for 10 minutes with 90% acetone at 0° C. The insoluble precipitate was washed twice with 0.01 M phosphate buffer (pH 7.4) and then suspended in the same buffer. This extract of cytochrome oxidase was assayed manometrically at constant volume, pressure and temperature, by measuring the $O_2$ uptake with a cytochrome C serving as a main substrate in the reaction mixture. The yield of cytochrome oxidase was 5 times higher in the extract incorporated with polyethylene glycol than same extract prepared under the same condition but without using polyethylene glycol.

Examples 11–12

The activity of crude extracts of phosphatase, L-amino acid oxidase and tyrosinase enzymes from various appropriate polyethylene glycol—buffers of 0.1 M sodium acetate at pH 5.0 and 0.1 M sodium phosphate at pH 6, respectively, was higher than buffer extracts without polyethylene glycol in the extracting media. Homogenization at high speed and centrifugation steps were carried out at 2–3° C.

Inactive protein as gelatin and milk casein was precipitated rapidly on adding a solution of 1% tannin in a test tube. Polyethylene glycol precipitated tannin rapidly in a similar test tube.

Fresh green banana in the preclimacteric stage was cut and 25 ml. latex exudate was collected. The exudate was degummed by centrifuging at 2000 r.p.m. for 10 minutes and supernatant was decanted. 10 ml. was added to an inert protein solution as 1% gelatin and milk casein. Thick white/gray insoluble complex of protein-polyethylene glycol was formed rapidly. Another 10 ml. of degummed latex exudate was mixed with 10 ml. of 5% polyethylene glycol and centrifuged at 2000 r.p.m. for 10 minutes to precipitate the polyethylene glycol-tannin insoluble complex. When supernatant was decanted and mixed with inert protein solution as 1% gelatin and milk casein, there was no precipitation of protein in the mixture. The components were maintained in solution.

Although specific embodiments of the invention have been described herein it is not intended to limit the invention solely thereto but to include all of the obvious variations and modifications within the spirit and scope of the appended claims.

What is claimed is:

1. In the process of preparing an enzyme concentrate by extraction from a naturally occurring plant source at a temperature from about $-10°$ to about $+5°$ C., the step which comprises employing as the extractant for said enzyme an aqueous solution containing from 0.5% to 5% by weight of a polyalkylene glycol in which each alkylene group contains from two to three carbon atoms, said polyalkylene glycol having an average of at least about 25 alkylene oxide units per molecule.

2. The process as claimed in claim 1 in which said polyalkylene glycol is polyethylene glycol.

3. The process as claimed in claim 1 in which the number of alkylene oxide units is less than about 700 and said polyalkylene glycol is soluble in acetone.

4. The process as claimed in claim 3 in which said enzyme is polyphenol oxidase and said polyalkylene glycol is polyethylene glycol.

5. The process as claimed in claim 3 in which said enzyme is pectinesterase and said polyalkylene glycol is polyethylene glycol.

6. The process as claimed in claim 3 in which said enzyme is polygalacturonase and said polyalkylene glycol is polyethylene glycol.

7. The process as claimed in claim 3 in which said enzyme is cytochrome oxidase and said polyalkylene glycol is polyethylene glycol.

8. The process as claimed in claim 3 in which said enzyme is succinic oxidase and said polyalkylene glycol is polyethylene glycol.

9. The process as claimed in claim 3 in which said enzyme is phosphatase and said polyalkylene glycol is polyethylene glycol.

10. The process as claimed in claim 3 in which said enzyme is amino acid oxidase and said polyalkylene glycol is polyethylene glycol.

11. The process as claimed in claim 3 in which said enzyme is tyrosinase and said polyalkylene glycol is polyethylene glycol.

12. The process as claimed in claim 3 in which said enzyme is an active protein and said polyalkylene glycol is polyethylene glycol.

13. The process as claimed in claim 3 in which said extracted material is protein and said polyalkylene glycol is polyethylene glycol.

14. The process as claimed in claim 3 in which said extractant solution contains in addition from about 0.005% to about 0.05% surface active agent.

15. The process as claimed in claim 3 including the step of precipitating a material rich in enzyme from said extractant solution by mixing with acetone.

16. The process as claimed in claim 4 in which said extractant solution contains in addition from about 0.005% to about 0.05% surface active agent.

17. The process as claimed in claim 4 including the step of precipitating a material rich in polyphenol oxidase from said extractant solution by mixing with acetone.

18. The process as claimed in claim 16 including the step of precipitating a material rich in polyphenol oxidase from said extractant solution by mixing with acetone.

References Cited

UNITED STATES PATENTS

| 3,002,891 | 10/1961 | Heinicke | 195—66 |
| 3,274,073 | 9/1966 | Burdick | 195—66 X |

LIONEL M. SHAPIRO, *Primary Examiner.*